Jan. 18, 1927.  
G. E. NERNEY  
1,614,848  
EYEGLASS CONSTRUCTION  
Filed June 16, 1923
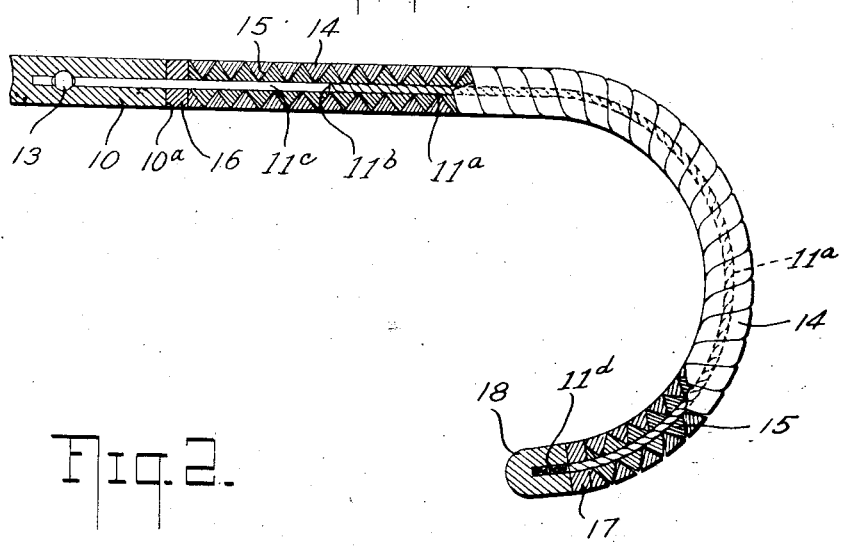
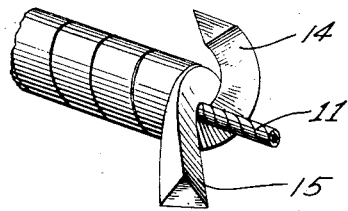
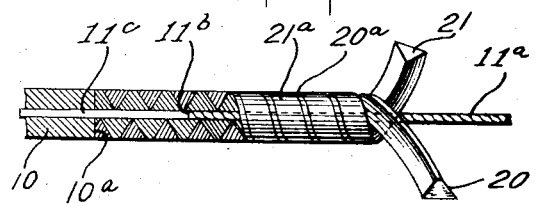
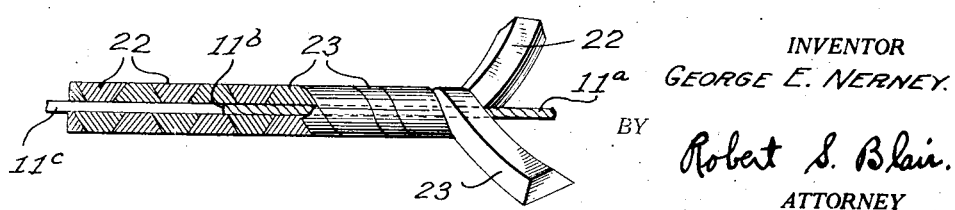
INVENTOR  
GEORGE E. NERNEY.  
BY  
Robert S. Blair.  
ATTORNEY Patented Jan. 18, 1927.

1,614,848

UNITED STATES PATENT OFFICE.

GEORGE E. NERNEY, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed July 16, 1923. Serial No. 645,786.

This invention relates to eyeglass construction and with regard to its more specific features to the construction of eyeglass temple bars.

One of the objects of the invention is to provide a construction of the above nature, capable of highly satisfactory and dependable service. Another object is to provide such a construction which is strong and durable and well adapted to meet the requirements of practical use. Another object is to provide a construction of the above character, neat in appearance, and capable of affording the wearer thereof a high degree of satisfaction in regard to convenience and comfort. Another object is to provide a practical art for producing a construction of the above nature which may be conveniently and inexpensively carried on. Other objects will be in part obvious or in part pointed out hereinafter.

The invention accordingly consists in the features of construction, combinations of elements, arrangements of parts, and in the several steps and relation and order of each of the same to one or more of the others all as will be illustratively herein described, and the scope of the application of which will be indicated in the following claims.

In the accompanying drawing in which are shown one or more various possible embodiments of the several mechanical features of this invention, Figure 1 is a partial side elevation of a temple bar shown partly in section to better disclose the structure;

Figure 2 is a fragmentary view of certain parts shown in Figure 1;

Figure 3 is a side view partly in section of a portion of a temple bar showing a modified form of parts shown in Figure 1; and Figure 4 is a view similar to Figure 3 showing still another form.

Similar reference characters refer to similar parts through the several views of the drawings.

Referring now to the drawing in detail, in Figure 1 there is shown the rear portion of a temple bar. A member 10 of some suitable non-metallic material, such as celluloid, forms the main or body portion of the temple bar and as will be understood extends forwardly and is connected to the eyeglass rim or other lens mounting by means of a suitable connection in the usual manner. Extending rearwardly from the body member 10 is a metallic extension 11, the rear portion of which is curved to suitable contour as to form an ear piece as shown. The metallic extension 11 is secured to the member 10, preferably by having its forward portion held in a recess indicated generally at 12, formed in the rear portion of the member 10 and extending substantially coaxial therewith. The portion of the metallic extension 11 within the recess 12 is provided with projections embedded in the member 10 and preferably taking the form of a pair of oppositely disposed flanges, such as 13. These flanges 13, embedded in the non-metallic member 10, serve to provide a firm dependable anchorage for the member 11 therein avoiding possibility of the member 11 turning in the recess 12 or being withdrawn therefrom.

In joining the metallic extension 11 and the body member 10, the recess 12 is preferably first formed, for example, by drilling. The portion of the member 10 about the recess 12 may then be softened by suitable treatment and the end of the member 11, having the flanges 13 formed thereon, may then be forced into the recess and into place therein. The material of the member 10 thereupon being pressed firmly in about the member 11 within the recess 12, a firm secure connection is obtained.

As before mentioned, the rear portion of the metallic extension 11 is curved to suitable contour as to form the earpiece of the temple bar. This curved portion of the extension 11, indicated generally at 11$^a$, is flexible, being formed preferably of a spirally wound wire member as is indicated in the drawing, whereby the desired degree of flexibility is obtained. The portion of the extension 11 within the recess 12 and extending rearwardly to a substantial distance therefrom, as for example to the point 11$^b$, is preferably of a relatively rigid construction adapted to resist flexing to a greater degree than the remaining portion 11$^a$. The flexible portion 11$^a$ of the member 11 and the more rigid portion 11$^c$ thereof may be formed of two separate members secured together, as for example by soldering at the point 11$^b$. Preferably, however, the metallic extension 11 is formed of one continuous member of spirally wound wire and the more rigid portion 11ᶜ thereof is formed by soldering or otherwise joining the adjacent coils of that portion. Ordinarily the spirally wound wire is tinned and in order to form a relatively rigid portion as 11ᶜ, a portion of the spiral wire may be dipped in suitable flux, whereupon the adjacent coils of that portion may be conveniently soldered together.

Formed about the metallic extension 11, is a covering of non-metallic material, such as celluloid, which takes the form of a spiral winding or cable, the metallic extension 11 forming a suitable core therefor. As may be more readily seen in Figure 2, this covering is preferably formed of two strips 14 and 15 of non-metallic material conjointly wound about the metallic extension or core 11. The two strips 14 and 15 are preferably shaped in cross section, so that when conjointly wound to form the spiral cable or covering their abutting surfaces interfit and to this end the strips are preferably formed substantially triangular in cross section as shown. The strip 15 is wound with a flat side directed inwardly and bearing against the core 11 and the strip 14 is wound in the reverse position, that is with a flat surface directed outwardly away from the core 11. Thus when the two strips 14 and 15 are conjointly wound in parallel about the core, they form a substantially solid covering or cable having a smooth bore and presenting a substantially regular and even exterior surface. Such a winding provides a covering which is easily flexed with the metallic core 11, providing a smoothly operating structure and furthermore as the parts are flexed, there are no gaps between the adjacent coils, the two windings coacting in such a manner as to provide at all times a substantially solid structure and a substantially regular and smooth exterior surface.

Preferably before being placed upon the metallic extension 11, the non-metallic covering or cable is formed upon a suitable mandrel. The celluloid strips 14 and 15 having been formed to the desired cross section are softened to a suitable degree by any desired treatment and are thereupon wound conjointly upon a suitable mandrel of substantially the diameter of the metallic extension 11 and are formed and allowed to harden thereon. The cable, after having been thus formed, is cut to the required length and the ends of the windings are secured to a pair of non-metallic washers 16 and 17, as for example by means of cementing. The washers 16 and 17 serve to hold the ends of the winding and provide suitable end portions for the non-metallic cable.

The non-metallic cable comprising the two windings 14 and 15 and the washers 16 and 17 is thereupon slipped over the end of the metallic extension 11 until the washer 16 comes up against the end 10ᵃ of the body member 10. The extreme end of the metallic extension 11 is threaded as at 11ᵈ and threaded thereon is a non-metallic cap 18 which when threaded firmly against the washer 17 serves to hold the flexible non-metallic covering in place. It will be seen that if it be desired to remove the covering from the metallic extension 11 for any reason, it is merely necessary to remove the cap 18 whereupon the non-metallic cable may be readily slipped off and may also be readily replaced, its ends being securely held by the washers 16 and 17.

In Figures 3 and 4 there are shown modified forms of the non-metallic covering or winding shown in Figures 1 and 2. The winding of Figure 3 comprises two strips of material 20 and 21, wound conjointly about the core 11, the winding 21 having a cross section substantially triangular and wound with a flat side directed outwardly, and the winding 20 having a cross section determined substantially by the shape of a triangle somewhat flattened at its apex. The two strips are so wound that the flattened portion 20ᵃ of the strip 20 which is coiled about intermediate of the adjacent coils of the strip 21 is substantially even with the surface 21ᵃ of the strip 21, so that a smooth even surface of the winding is obtained. The winding of Figure 4 comprises two strips 22 and 23 conjointly wound and of substantially similar cross section, the cross section being determined substantially by the shape of a triangle cut off below the apex or by the shape of a trapezoid. The strip 22 is wound with its wider base directed outwardly from the core 11, and the strip 23 is wound with its wider base directed inwardly toward the core 11.

An eyeglass temple bar constructed as above described, possesses features embodying many practical advantages. The parts are dependably held in assembled relation to provide a strong, durable structure and are yet readily accessible in case need of repair should arise. The non-metallic windings about the core 11 provide a covering which is easily flexed with the flexible core, the curved earpiece therefore being of a nature such as adapts it to assuming a comfortable and convenient position about the ear of the wearer. Furthermore, the non-metallic covering is of such a nature that upon being flexed with the core, its parts coact to always provide a dependable covering and leave no unsightly gaps between coils to collect dirt.

It may be here noted that the end washers 16 and 17, shown in Figure 1 secured to the ends of the non-metallic winding, are not essential and may be dispensed with if desired. In such case the end portion of the windings or cable are secured together along their abutting surfaces by cementing or other suitable means and the ends of the cable are thereby securely held. Such a construction is illustrated in Figure 3 wherein the cable after having the end portion of the windings cemented or otherwise secured together is slipped over the metallic extension 11 and against the end 10ᵃ of the main member 10 without the interposition of a washer.

As various possible embodiments may be made of the mechanical features of the above invention and as the art herein described might be varied in various parts, all without departing from the scope of the invention, it is to be understood that all matter herein set forth or shown in the accompanying drawings is to be interpretated as illustrative and not in a limiting sense.

I claim as my invention:

1. In construction for eyeglass temple bars, in combination, a flexible metallic core member, a strip of non-metallic material spirally wound about said core member, triangular in cross-section and wound with an edge formed by the intersection of two sides thereof directed inwardly toward said core member and the third side thereof being in a plane substantially parallel to the axis of said core, and a second strip of non-metallic material spirally wound between adjacent coils of said first strip, substantially triangular in cross-section having sides mating with the opposing sides of adjacent coils of said first strip and a third side resting against said core.

2. In construction for eyeglass temple bars, in combination, a flexible metallic core member, a strip of non-metallic material spirally wound about said core member having a flat base surface resting against said core and side surfaces converging outwardly therefrom, said strip being wound with the side edges of said base surface substantially meeting between adjacent coils so that said winding forms a substantially continuous covering for said core having therein a spiral groove of V-shaped cross-section, and a second strip of non-metallic material of triangular cross-section wound in said groove with an edge directed inwardly and substantially filling said groove.

3. In construction for eyeglass temple bars, in combination, a flexible metallic core member, a strip of non-metallic material spirally wound about said core member having a flat base surface in a plane substantially parallel to the axis of said core and side surfaces converging away from said base surface, the coils of said strip being closely wound so that the side edges of said base surface substantially meet between adjacent coils and so that said winding forms a substantially continuous covering for said core having therein a spiral groove of V-shaped cross-sections, and a second strip of non-metallic material of triangular cross-section, wound in said groove with an edge directed toward the base of said V-shaped groove and substantially filling said groove.

4. In construction for eyeglass temple bars, in combination, a flexible metallic core member, a strip of non-metallic material spirally wound about said core member having a flat base surface in a plane substantially parallel to the axis of said core and side surfaces converging away from said base surface, the coils of said strip being closely wound so that the side edges of said base surface substantially meet between adjacent coils and so that said winding forms a substantially continuous covering for said core having therein a spiral groove of V-shaped cross-section, and non-metallic means resting in said V-shaped groove and substantially filling the same.

In testimony whereof, I have signed my name to this specification this 14th day of June, 1923.

GEORGE E. NERNEY.